United States Patent [19]

Kreusch et al.

[11] Patent Number: 4,534,867
[45] Date of Patent: Aug. 13, 1985

[54] SYSTEM FOR REMOVING IRON AND/OR OTHER CHEMICALLY REDUCING SUBSTANCES FROM POTABLE WATER

[75] Inventors: Edward G. Kreusch, Arlington Heights; Bruce F. Brodzik, Mundelein, both of Ill.

[73] Assignee: Culligan International Company, Northbrook, Ill.

[21] Appl. No.: 590,575

[22] Filed: Mar. 16, 1984

Related U.S. Application Data

[63] Continuation-in-part of Ser. No. 525,966, Aug. 24, 1983, abandoned, which is a continuation-in-part of Ser. No. 502,238, Jun. 8, 1983, abandoned.

[51] Int. Cl.³ .............................................. C02F 1/64
[52] U.S. Cl. .................................. 210/722; 210/756; 210/763; 210/794; 210/912
[58] Field of Search ............... 210/722, 763, 753, 754, 210/756, 912, 794

[56] References Cited

U.S. PATENT DOCUMENTS

| | | |
|---|---|---|
| 1,990,214 | 2/1935 | Zapffe . |
| 2,144,051 | 1/1939 | Frankforter . |
| 2,237,882 | 4/1941 | Lawlor et al. . |
| 2,365,729 | 12/1944 | Schumacher . |
| 2,834,466 | 5/1958 | Hament . |
| 3,017,347 | 1/1962 | Kratz . |
| 3,118,833 | 1/1964 | Reinhardt . |
| 3,171,800 | 3/1965 | Rice et al. . |
| 3,222,277 | 12/1965 | Joyce . |
| 3,617,562 | 11/1971 | Cywin et al. . |
| 3,649,532 | 3/1972 | McLean . |
| 4,430,228 | 2/1984 | Paterson .................... 210/772 X |

FOREIGN PATENT DOCUMENTS

| | | |
|---|---|---|
| 0069800 | 8/1981 | European Pat. Off. . |
| 0069220 | 5/1982 | European Pat. Off. . |
| WO82/03850 | 11/1982 | PCT Int'l Appl. . |

*Primary Examiner*—Thomas Wyse
*Attorney, Agent, or Firm*—George H. Gerstman

[57] ABSTRACT

A system is provided for removing iron and/or other chemically reducing substances from potable water having a pH between 5 and 9. The system includes a tank for receiving the water which tank contains a bed of activated carbon. The untreated water is aerated prior to its communication with the activated carbon. All of the aerated water is allowed to flow through the bed and the activated carbon provides a catalytic action, whereby substantially all of the oxidation occurs throughout the bed of activated carbon and the use of chemical oxidizing agents is obviated. The tank provides a reaction site for oxidation in the catalyst, precipitation of the oxidized ions, and retention by filtration of the precipitated particles.

7 Claims, 1 Drawing Figure

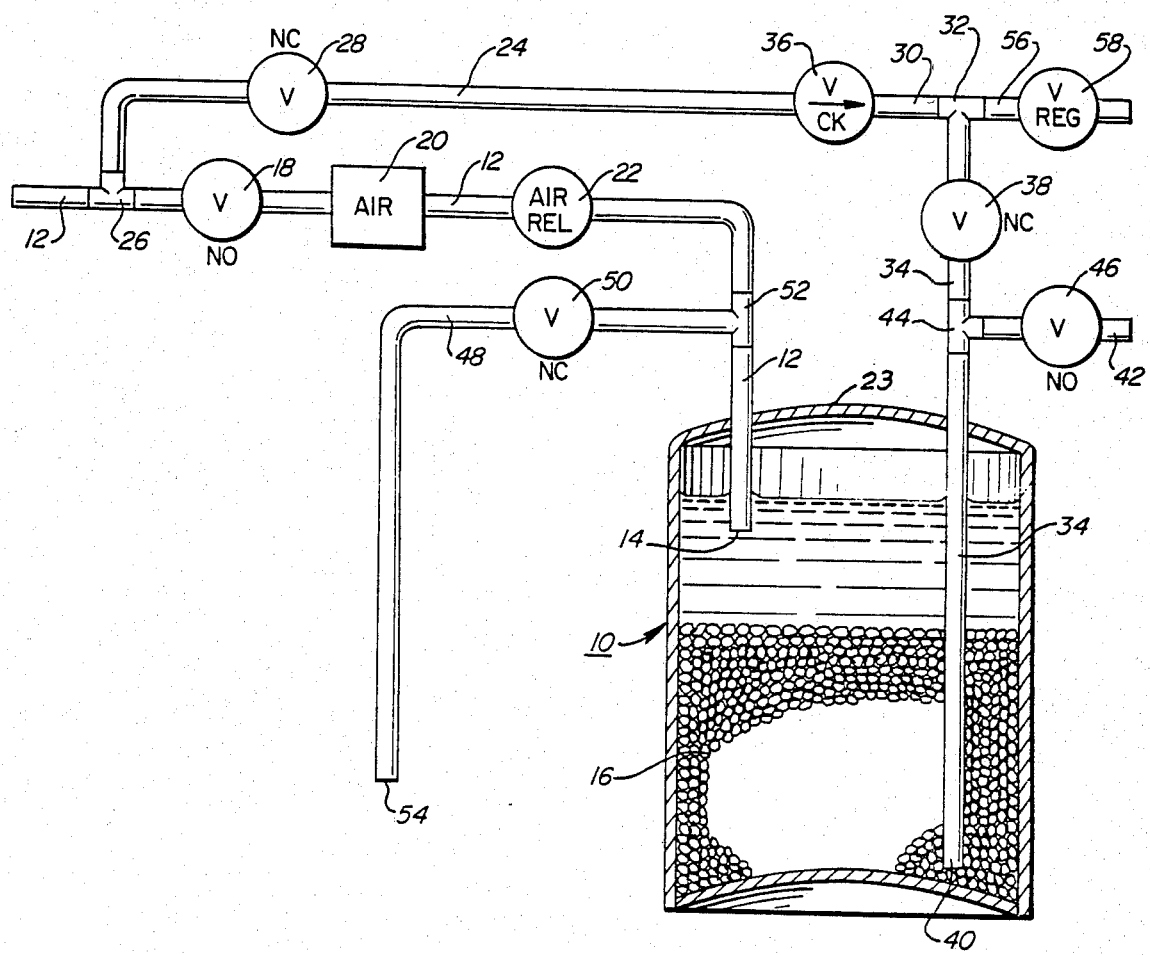

SYSTEM FOR REMOVING IRON AND/OR OTHER CHEMICALLY REDUCING SUBSTANCES FROM POTABLE WATER

BACKGROUND OF THE INVENTION

This application is a continuation-in-part of U.S. application Ser. No. 525,966, filed Aug. 24, 1983, abandoned, which is a continuation-in-part of U.S. application Ser. No. 502,238, filed June 8, 1983, abandoned.

The present invention concerns a novel system for removing iron and/or other chemically reducing substances from potable water having a pH between 5 and 9.

Prior art filter systems for removing iron and/or other chemically reducing constituents, such as manganese and sulfur, from acqueous environments have been found to have certain limitations. For example, in certain prior art filter systems, oxidation filter media are used, such as manganese treated greensand. These oxidative filter media generally require frequent chemical regeneration. For example, manganese treated greensand must frequently be regenerated with potassium permanganate or with sodium hypochlorite. Non-oxidative filter media typically require detention time added for the purpose of providing time for the oxidation reaction which is relatively slow unless it has been catalyzed.

Certain prior art filter systems utilize inert filter media. One filter medium which falls within this example is sand. However, inert filter media generally require the influent stream to be of adequate composition to oxidize and/or precipitate the contaminants.

Another prior art system utilizes alkaline media to modify partly the water composition so that removal efficiencies might be increased. Such alkaline filter media includes, for example, calcium carbonate, magnesium carbonate and magnesium hydroxide. In such systems, the replacement of the alkaline media is periodically required.

In McLean U.S. Pat. No. 3,649,532, a system for treating water is disclosed in which the water is aerated and then passed through a mineral bed comprised of an alkalinity adding material such as a dolomite (a mixture of calcium and magnesium carbonates) or calcium carbonate, for raising the pH to 7.0–7.5. It has been found that the present invention, which will be described below, has a significantly greater flow rate (the rate of flow in gallons per hour to achieve effective filtering) and capacity (the volume of aqueous solution that can be filtered before backwashing of the filter is required) than the McLean system.

Other prior art systems utilize chemical oxidants such as chlorine, sodium hypochlorite or potassium permanganate in order to oxidize the chemically reducing contaminants. These have, under some conditions, required additional modification of the aqueous composition by addition of precipitating reagents. Extended contact time is often required. In addition, oxidative chemicals are generally hazardous and damaging when spills or unintended use occurs.

One prior art system which utilizes chemical oxidizing agents is disclosed in Kratz U.S. Pat. No. 3,017,347, in which (column 1, lines 41-49) "the process is characterized by passing the water which has been dosed with suitable quantities of oxidizing agents, such as ozone, chlorine, chlorine dioxide or the like over granular activated carbon. The heavy metal compounds which are oxidized by the oxidizing means but remain in the dissolved state are catalytically deposited on the active surface of the carbon. Simultaneously the taste and odor causing substances are absorbed by the active carbon."

It is desirable, however, to avoid the use of chemical oxidizing agents so that it is unnecessary for the user to be required to purchase and have to frequently use chemicals for the purpose of oxidation.

It is, therefore, an object of the present invention to provide an improved system for removing soluble and insoluble chemically reducing substances from potable water, without the addition of purchased reagents, or multi-step regeneration procedures.

SUMMARY OF THE INVENTION

In accordance with the present invention, a novel system is provided for removing iron and/or other chemically reducing substances, such as sulfur compounds, from potable water having a pH between 5 and 9, most typically about 7. The system comprises a tank for receiving the water and containing a bed of activated carbon. Means are provided for aerating the water prior to its communication with the activated carbon. All of the aerated water is introduced to the bed of activated carbon. The activated carbon provides a catalytic action whereby substantially all of the oxidation occurs throughout the bed of activated carbon and the use of chemical oxidizing agents is obviated. Further, additional detention time is not needed beyond the residence time within the filter bed. Thus, the system provides an economy over presently known iron filter systems.

In the illustrative embodiment, means are provided for removing excess gas from the aerated water prior to its communication with the activated carbon. The tank is one-half to three-quarters filled with the activated carbon and the activated carbon comprises granular activated carbon having a mesh size between 6 mesh and 100 mesh. The aerating means comprises an air pump and the excess gas removing means comprises an air relief valve.

In the illustrative embodiment, a chemical enhancer such as sodium hypochlorite solution or calcium hypochlorite is introduced to the activated carbon bed during backwashing and used to enhance the catalytic properties of the activated carbon.

A more detailed explanation of the invention is provided in the following description and claims, and is illustrated in the accompanying drawing.

BRIEF DESCRIPTION OF THE DRAWING

The FIGURE comprises a schematic diagram of an iron removal system constructed in accordance with the principles of the present invention.

DETAILED DESCRIPTION OF THE ILLUSTRATIVE EMBODIMENT

Referring to the FIGURE, a chemically-reducing removal system is illustrated therein comprising a tank 10 for receiving potable water, such as from a household supply of untreated potable water, via first conduit 12. The water to which the present invention is applicable has a pH between 5 and 9, preferably about 7.

Conduit 12 extends from the source of untreated water, such as a well or municipal water supply, and the first conduit has one end 14 which extends into tank 10 but terminates above a bed 16 of activated carbon. It has been found desirable for the activated carbon bed 16 to fill one-half to three-quarters of the tank. Thus a tank that is 44 inches in height would have approximately 30 inches of activated carbon bed 16. The activated carbon of the instant invention comprises granular activated carbon having a mesh size between 6 mesh and 100 mesh (U.S. standard sieve).

Connected in series with first conduit 22 is an aerating means 20, such as a conventional venturi air aspirator 20 or preferably an air pump 20, for introducing air or other oxygen-containing gas into the untreated potable water. Downstream of aerating means 20 but also connected in series with conduit 12 is a conventional air relief valve 22 for removing the excess air. Alternatively, the air relief valve may be connected directly to the top 23 of tank 10 by a threaded fitting or the like so that the excess gas from the aerated water within the tank is removed. It is preferable to leave a residue of undissolved air within tank 10. To achieve effective iron removal, all of the aerated water is introduced to bed 16.

A second conduit 24 is connected at junction 26 to first conduit 12, upstream of aerating means 20. A second valve 28 is connected to second conduit 24 and one end 30 of second conduit 24 is connected to a junction 32 which connects to third conduit 34. A check valve 36 is provided in conduit 24 with the flow permitted in the direction of the arrow. A third valve 38 is connected to third conduit 34. Third conduit 34 extends into the activated carbon bed 16 with its end 40 being positioned to receive the treated water and convey it to a fourth conduit 42 which is connected at junction 44 to third conduit 34. Fourth conduit 42 is provided with a fourth valve 46.

A fifth conduit 48 containing a fifth valve 50 is connected to first conduit 12 at junction 52. One end 54 of the fifth conduit is connected to drain and the fifth conduit 48 is operable for conveying untreated water during backwashing as will be described below.

A sixth conduit 56 containing a flow regulator 58 is connected at junction 32 to second conduit 24 and is utilized as a bypass conduit for conveying some of the untreated water which flows via second conduit 24 during backwashing.

Valves 18, 28, 38, 46 and 50 may be manually operated or may be operated by suitable automatic means. During the normal filtering operation, valves 18 and 46 (marked "NO" on the Figure) are normally open, while valves 28, 38 and 50 are normally closed (marked "NC" on the Figure). On the other hand, during backwashing valves 18 and 46 are normally closed while valves 28, 38 and 50 are normally open.

In the operation of the system, during filtering the untreated potable water will flow via conduit 12 and will be aerated by air pump 20, with the excess air removed by relief valve 22. All of the aerated water will flow into tank 10, and substantially no oxidation will take place until the aerated water passes through the activated carbon bed 16. Thus substantially all of the oxidation takes place throughout the activated carbon bed 16 on the surfaces of the activated carbon due to the catalytic action of the activated carbon and the highly porous structure thereof.

The treated water flows via conduit 34 and conduit 42 to storage or use.

When backwashing is desired, valves 18 and 46 are closed and valves 28, 38 and 50 are opened. The untreated water will then flow through conduit 24 and conduit 34, and will backwash bed 16, with the backwash flowing up through end 14 of conduit 12 and via conduit 48 to drain. Flow regulator 58 is adjusted so that conduit 56 can be utilized as a bypass for untreated water that is not being used for the backwash.

It has been found that greater removal of chemically reducing substances, such as iron, sulfur compounds, etc., from water is achieved by using a chemical enhancer for the activated carbon catalyst. To this end, an enhancer such as sodium hypochlorite solution or calcium hypochlorite (dissolved in water) can be used. The enhancer is introduced to the activated carbon bed during backwashing, preferably during a twenty-minute portion of the backwash procedure in a concentration of 500 parts per million with respect to the backwash. An improvement of over 50 percent in iron removal resulted from the use of a sodium hypochlorite solution enhancer.

By using the present invention, it has been found that it is unnecessary to utilize a detention tank for providing residency time for the oxidation and precipitation, as is often required in prior art constructions. The tank provides a reaction site for oxidation in the catalyst, precipitation of the oxidized ions, and retention by filtration of the precipitated particles. Further, the system of the present invention has been found to provide vastly superior performance with respect to prior art systems. For example, utilizing the present invention the filter rate has been increased many multiples over prior art systems and the capacity (volume filtered prior to backwashing) has increased many multiples over prior art systems.

In the tests performed by applicants, the activated carbon comprised either CULLAR G granular carbon or CIM granular carbon, both distributed by Culligan USA, One Culligan Parkway, Northbrook, Ill. The CIM granular carbon provided most effective performance.

Although an illustrative embodiment of the invention has been show and described, it is to be understood that various modifications and substitutions may be made by those skilled in the art without departing from the novel spirit and scope of the present invention.

What is claimed is:

1. A process for removing iron and other chemically reducing substances from potable water having a pH between 5 and 9, which comprises the steps of:
    providing a tank for receiving all of the potable water to be treated, said tank containing a bed of granular activated carbon;
    aerating the water with an air pump prior to its communication with the granular activated carbon;
    directing all of the aerated water into said tank to introduce the aerated water to said bed of granular activated carbon, whereby the activated carbon provides a catalytic action so that substantially all of the oxidation occurs throughout the bed of activated carbon and the use of chemical oxidizing agents is obviated and the need for a detention tank is obviated; and
    removing excess gas from the aerated water prior to its communication with the activated carbon.

2. A process as described in claim 1, including the step of introducing a chemical enhancer to the activated carbon to enhance the catalytic action thereof.

3. A process as described in claim 2, in which the chemical enhancer is introduced during backwashing of the activated carbon.

4. A process as described in claim 2, in which the chemical enhancer is sodium hypochlorite solution.

5. A process as described in claim 2, in which the chemical enhancer is calcium hypochlorite solution.

6. A process as described in claim 1, including the step of providing a relief valve on the tank for removing the excess gas, and leaving a residue of undissolved gas within the tank.

7. A process for removing iron and other chemically reducing substances from potable water as described in claim 1, in which the aerated water is directed into said tank above said bed of granular activated carbon whereby said aerated water will flow downwardly through said bed of granular activated carbon.

* * * * *